(12) United States Patent
Herrmann et al.

(10) Patent No.: US 12,467,724 B1
(45) Date of Patent: Nov. 11, 2025

(54) BIODEGRADABLE AND EDIBLE DISC TARGET

(71) Applicant: KECS, LLC, San Antonio, TX (US)

(72) Inventors: Brendan Herrmann, San Antonio, TX (US); Blake Burke, San Antonio, TX (US); Richard N. Azar, San Antonio, TX (US)

(73) Assignee: KECS, LLC, San Antonio, TX (US)

( * ) Notice: Subject to any disclaimer, the term of this patent is extended or adjusted under 35 U.S.C. 154(b) by 677 days.

(21) Appl. No.: 17/377,600

(22) Filed: Jul. 16, 2021

Related U.S. Application Data

(60) Provisional application No. 63/054,445, filed on Jul. 21, 2020.

(51) Int. Cl.
| | |
|---|---|
| *F41J 1/01* | (2006.01) |
| *A23K 10/33* | (2016.01) |
| *A23K 20/179* | (2016.01) |
| *A23K 30/20* | (2016.01) |
| *A23K 40/20* | (2016.01) |

(52) U.S. Cl.
CPC ............ *F41J 1/01* (2013.01); *A23K 10/33* (2016.05); *A23K 20/179* (2016.05); *A23K 30/20* (2016.05); *A23K 40/20* (2016.05)

(58) Field of Classification Search
CPC . F41J 1/01; A23K 30/12; A23K 30/20; A23K 40/20; A23L 3/44; A23B 4/037
See application file for complete search history.

(56) References Cited

U.S. PATENT DOCUMENTS

| | | | | |
|---|---|---|---|---|
| 2,765,236 | A | * 10/1956 | Blaine, Jr. ............... | A23B 4/037 426/385 |
| 3,359,001 | A | * 12/1967 | Silva ......................... | F41J 1/01 273/362 |
| 4,147,324 | A | * 4/1979 | Walter ...................... | F41J 1/01 249/126 |
| 4,623,150 | A | 11/1986 | Moehlman et al. | |
| 4,920,762 | A | * 5/1990 | Beckstead .................. | F41J 1/01 249/161 |
| 5,174,581 | A | 12/1992 | Goodson | |
| 5,467,998 | A | * 11/1995 | Hellings ............ | A01K 39/0106 119/51.01 |
| 5,651,550 | A | 7/1997 | Lavorgna et al. | |

(Continued)

FOREIGN PATENT DOCUMENTS

| | | | | |
|---|---|---|---|---|
| EP | 2664598 A1 | * 11/2013 | ....... | C04B 35/62204 |
| GB | 2351026 A | * 12/2000 | ................. | F41J 1/01 |

*Primary Examiner* — Jeffrey S Vanderveen
(74) *Attorney, Agent, or Firm* — William H. Quirk; Cassidi D. Banales; Rosenthal Pauerstein Sandoloski Agather, LLP

(57) ABSTRACT

A disc target for shooting sports is disclosed that is biodegradable and edible by wildlife. The disc target includes one or more natural ingredients that are readily available and typically inexpensive. The disclosed disc targets are biodegradable and can be consumed by local wildlife. Preferred embodiments of the disc targets are primarily made of alfalfa and/or other natural ingredients such as corn starch that can be used as a binding agent. The disc target can be utilized for shooting sports, such as trap or skeet shooting, as the disclosed disc targets are able to withstand the force of being launched in the air but also easily shatter when hit by only a few pellets from a shotgun.

20 Claims, 5 Drawing Sheets
(1 of 5 Drawing Sheet(s) Filed in Color)

(56) References Cited

U.S. PATENT DOCUMENTS

| | | | | |
|---|---|---|---|---|
| 5,676,377 | A | * 10/1997 | Lynn, Jr. | F41J 9/16 |
| | | | | 273/362 |
| 5,788,243 | A | 8/1998 | Harshaw et al. | |
| 5,915,695 | A | 6/1999 | Wisocki et al. | |
| 5,947,475 | A | 9/1999 | Skeuse et al. | |
| 5,967,521 | A | 10/1999 | Hellings | |
| 6,635,295 | B1 | * 10/2003 | Horigane | A23B 2/92 |
| | | | | 426/384 |
| 9,709,365 | B2 | 7/2017 | West | |
| 9,879,948 | B1 | * 1/2018 | Puckett | A01K 5/00 |
| 2002/0060428 | A1 | 5/2002 | Warren | |
| 2002/0168462 | A1 | * 11/2002 | Jefferson | A23K 50/70 |
| | | | | 426/623 |
| 2010/0207331 | A1 | 8/2010 | Boeh et al. | |
| 2012/0280105 | A1 | * 11/2012 | Dunbar | F41J 3/0004 |
| | | | | 249/126 |
| 2016/0273887 | A1 | * 9/2016 | West | F41J 1/01 |
| 2022/0053797 | A1 | * 2/2022 | Cryan | A23K 30/20 |

* cited by examiner

BIODEGRADABLE AND EDIBLE DISC TARGET

CROSS-REFERENCE TO RELATED APPLICATIONS

This application claims the benefit of the filing date of U.S. Provisional Application Ser. No. 63/054,445, filed on Jul. 21, 2020, entitled "Biodegradable and Edible Disc Target", the entire disclosure of which is hereby incorporated by reference into the present disclosure.

FIELD OF THE INVENTION

The present invention relates generally to a target for shooting sports, and more particularly to an environmentally friendly disc target which is biodegradable and edible.

BACKGROUND

Shooting sports are a group of competitive and recreational sporting activities that have been enjoyed by many in the centuries since firearms were first invented. Shooting sports involve proficiency tests of accuracy, precision, and speed with various types of weapons, primarily firearms and bows. Different disciplines of shooting sports can be categorized by a variety of factors, such as the equipment, distance, and targets used.

Some disciplines of shooting sports provide a method to practice hunting live animals. Disciplines that emulate bird hunting include trap shooting, skeet shooting, and sporting clays. These disciplines all involve shooting targets that are launched for the sportsman to shoot while the targets are airborne. The targets, also known as skeet or clay pigeons, used for such sports are usually the shape of disc or saucer, made of a mixture of pitch and pulverized limestone rock designed to withstand being thrown at high speeds, but at the same time easily broken when hit by very few pellets from a shotgun.

However, conventional targets typically include one or more ingredients that are not readily biodegradable and may even be toxic to wildlife if ingested. When conventional targets including such ingredients are hit and break apart, the resulting fragments fall to the ground. Because conventional targets often include non-biodegradable and/or toxic ingredients, it is preferable that the fragments are not left on the ground in order to prevent harm to wildlife and the environment. Removal of these fragments is likely to be time-consuming and labor-intensive.

Accordingly, there is a need for durable shooting sports targets that are made with one or more readily available ingredients that have no detrimental effect on the environment and wildlife. Embodiments of the present invention can be easily manufactured in a very cost-effective manner with one or two natural biodegradable ingredients that are also edible by wildlife.

BRIEF SUMMARY OF THE INVENTION

Disclosed embodiments provide an effective shooting sports target that is environmentally friendly. Furthermore, disclosed embodiments offer a product that is simple to manufacture cost effectively.

To those ends, among others, the disclosed embodiments include a means for shooting sports enthusiasts to participate in shooting activities with targets which resulting debris are biodegradable, and both desirable and edible for wildlife. Disclosed embodiments provide the same functionality of traditional targets, that can withstand the force of being mechanically launched in the air, but also easily break when hit by only a few shotgun pellets.

An object of the present invention is to offer a device that is easily manufactured with one or two natural ingredients. Disclosed embodiments provide for a target that is made with alfalfa and a binding agent of flour and water. Alternative natural binding agents such as other starches, molasses, agar agar, soy powder, gluten, eggs, or other foodstuff can be used in combination with alfalfa with similar results.

Preferred embodiments are manufactured by mixing alfalfa with flour and water to reach the proper consistency. The mixture is pressed into a mold that fits the desired dimensions of the target. The mold and mixture are then placed into a freezer until hardened. In preferred methods, the compressed mixture is allowed to freeze usually between 30 to 45 minutes. The frozen compression is then removed from the mold and placed into a specialized freeze dryer with a vacuum capable of reaching a temperature of about −54° Fahrenheit. The target is left for approximately 22 to 26 hours or until fully dry. To aid visibility, the target can be dyed to the desired color. The resulting product results in a shooting target that is durable enough to be launched, but brittle enough to shatter into chunks when enough force is applied. Alternative methods of manufacture could consist of mixing the alfalfa with alternative binding agents such as eggs or food paste. The mixture is similarly molded, frozen, and freeze dried.

Other embodiments are produced with without freeze drying. Alfalfa is combined with boiled pasta or beeswax and pressed into a mold and left to freeze for approximately 30 to 45 minutes or until hard enough to be removed from the mold. These methods produce a product similar target that is capable of withstanding the force of being thrown from a mechanical arm but are more pliable than preferred embodiments.

The disclosure, including descriptions, drawings, and claims, describes one or more embodiments of the invention. Many other features, objects, and advantages of the invention will be apparent to one of ordinary skill in the art from the disclosure. Given the disclosure, especially in light of the prior art, it is another object of the invention to improve upon, and overcome the inefficiencies, limitations, and constraints of, the prior art.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF PREFERRED EMBODIMENTS

The disclosures of this patent application, including the descriptions, drawings, and claims, describe one or more embodiments of the invention in more detail. Many other features, objects, and advantages of the invention will be apparent from these disclosures to one of ordinary skill in the art, especially when considered in light of a more exhaustive understanding of the numerous difficulties and challenges faced by the art. While there are many alternative variations, modifications and substitutions within the scope of the invention, one of ordinary skill in the art should consider the scope of the invention from a review of any claims that may be appended to applications and patents based hereon, including any amendments made to those claims in the course of prosecuting this and related applications.

Biodegradable and Edible Disc Target

Figure 1:
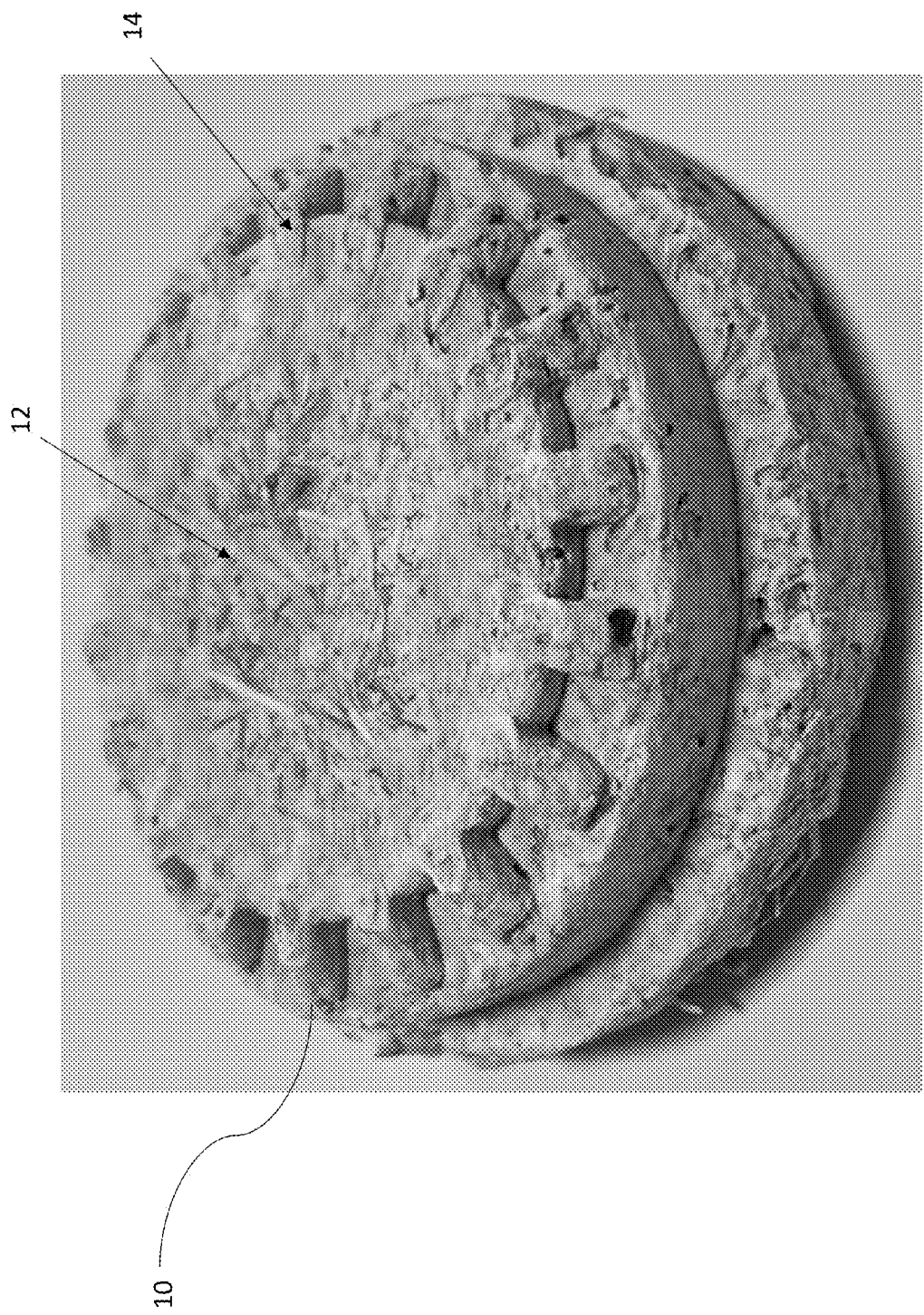
FIG. 1 is a photograph showing a preferred embodiment of the biodegradable and edible disc target 10.

Turning to FIG. 1, there is shown a preferred embodiment of the disc target 10. Preferred embodiments of the disc target 10 are made of processed alfalfa 12 from a hay bale and other natural ingredients that are detailed below. Preferred embodiments of disc target 10 are 108-110 mm in diameter, and 28-29 mm in height. Preferably, the disc targets 10 are typically between 100-105 g in mass. The dimensions, geometry, and mass of the disc target 10 allow it to be used in shooting sports such as skeet or trap shooting. Preferred embodiments of the disc target 10 have rigid protrusions 14 to aid in the launching of the disc target 10. Those skilled in the art will recognize that disc targets 10 can be manufactured in a variety of shapes, dimensions, and mass using the same process detailed below.

Figure 2:
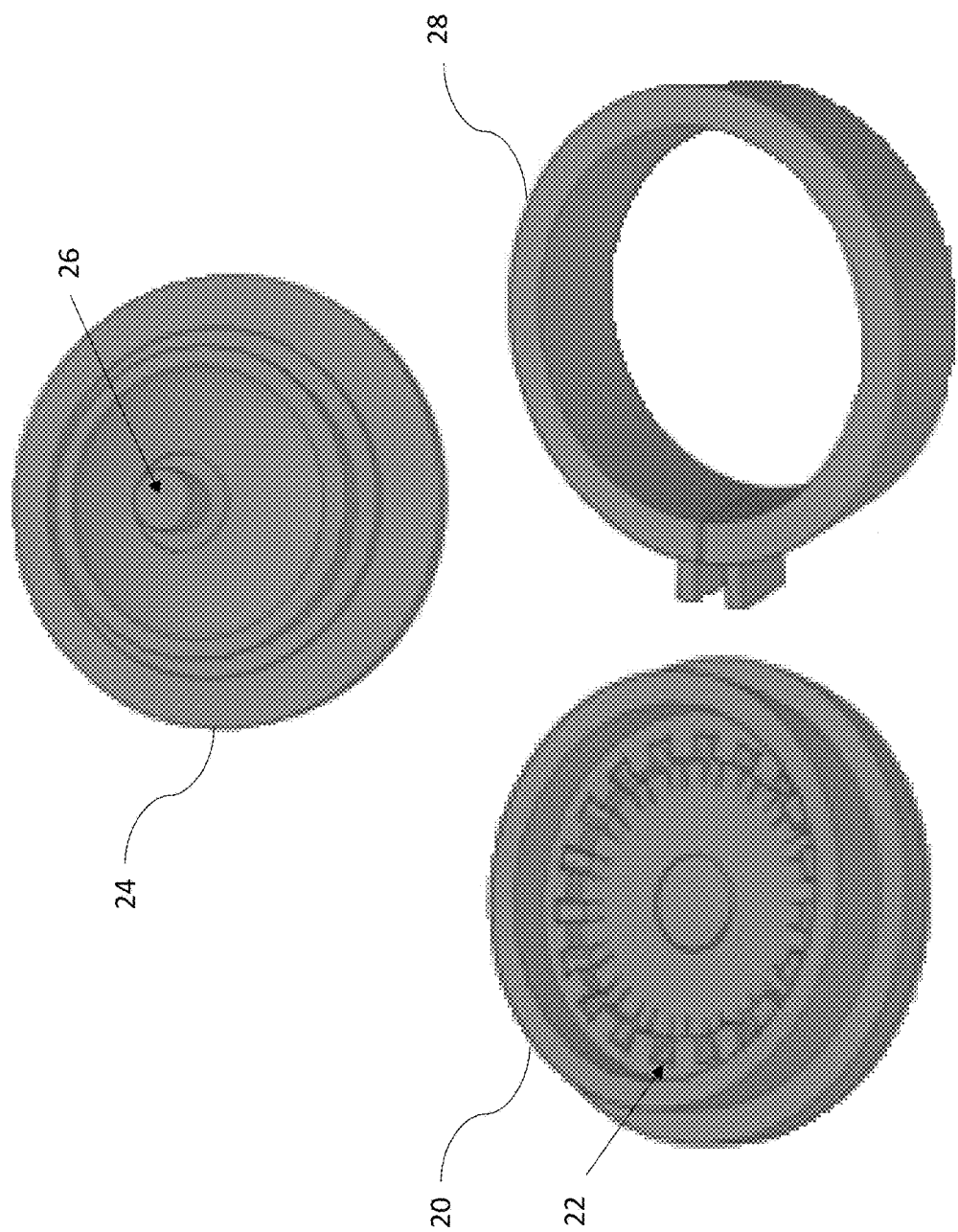
FIG. 2 shows a preferred embodiment of a disassembled mold.

Turning to FIG. 2, which shows a preferred embodiment of a disassembled mold used to produce the disc target 10. The mold is comprised of three pieces 20, 24, & 28 to aid in the process of extracting the disc target 10. The first piece 20 includes protrusions 22 seen at the top of the disc target 10 (as seen in FIG. 1), which allows the disc target 10 to be launched from a device with ease. The second piece 24 is placed at the top and has a knob 26 for the user to grab when assembling or disassembling the mold. The third piece 28 is placed between the first and second piece. Preferred embodiments of the assembled mold are 108-110 mm in diameter, and 28-29 mm in height. Those skilled in the art will appreciate that a mold of a varying dimensions, shapes, and consisting of more or less pieces can be used to achieve the desired result.

Figure 3:
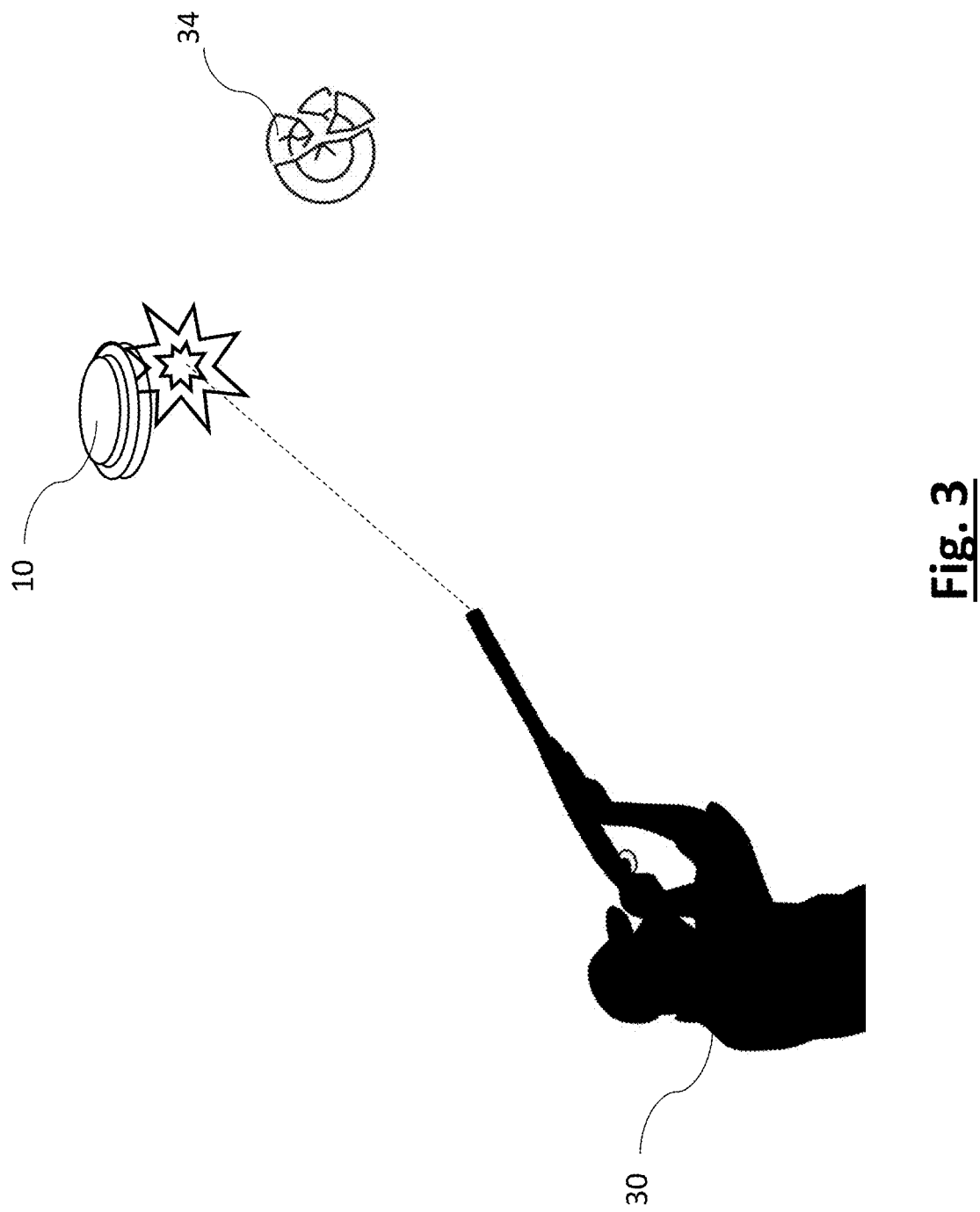
FIG. 3 illustrates the disc target 10 in use in shooting sports.

Turning to FIG. 3, which shows the use of the disc target 10 in shooting sports. The disc target 10 is durable enough to withstand the force of being launched or thrown into the air. The disc target 10 is also brittle enough to shatter into environmentally safe chunks when a sportsman 30 hits the target with a shotgun pellet to confirm a hit. The resulting debris 34 is non-toxic and will not be hazardous to the soil or environment. Preferred embodiments of the disc target 10 and debris 34 are entire composed of material that is edible, easily digestible, and desirable to wildlife to consume. Those skilled in the art will recognize that the image is only for illustrative purposes and not to scale.

Preferred Embodiment Manufacture Process

Figure 4:
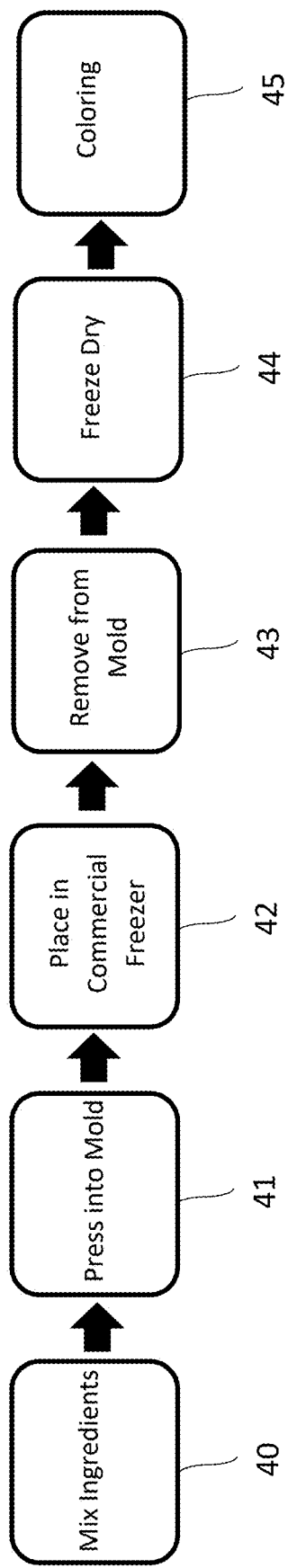
FIG. 4 shows a flow diagram illustrating a preferred method of manufacturing the biodegradable and edible disc target 10.

The process for producing preferred embodiments of the disclosed disc target is shown in FIG. 4. Preferred embodiments of the disclosed disc target 10 are manufactured by taking bales of alfalfa 12 and slicing them to the desired length, preferably with a forklift cutting mechanism. The slices of alfalfa 12 are placed into a grinder and processed into a powdered form.

In the first step 40 of producing preferred embodiments, 300 grams of powdered alfalfa 12 is mixed with 260 grams of flour and 16 ounces of water. The resulting mixture should have a thick batter texture. The correct consistency of the mixture is important, because if the mixture is too runny the final disc target 10 may crack. A mixture that is too dry will prevent the mixture from conforming to the molding process, detailed below.

In the next step 41, the mixture is placed into a mold with the desired dimensions for the disc target. Preferred embodiments use a mold that is 108 to 110 mm in diameter, and 28 to 29 mm in height. In step 42, the mold is placed into a commercial freezer until the mixture is hard enough to take out of the mold with ease to prevent damage to the final disc target 10. In preferred methods, the compressed mixture is allowed to freeze for about 30 to 45 minutes. Then in step 43, the mold is removed from the freezer and the frozen disc target 10 is removed from the mold.

The frozen disc target 10 is placed into a freeze dryer in step 44. The freeze dryer with a vacuum used in step 44 should be capable of reaching a temperature of about −54° Fahrenheit. The frozen disc target 10 should be removed when fully dry, which in preferred methods, takes approximately 22 to 26 hours. After the freeze dry process, if desired, target 10 can then be painted or dyed with a food-grade colorant to achieve a discernable color in the final step 45. Coloring the target 10 can help a shooter to more readily see and follow the track of target 10 when it is airborne.

Embodiments of the disc targets 10 are manufactured to be desirable targets for shooting sports in which traditional skeet or clay pigeons are utilized. Preferred embodiments are able to consistently withstand the force of being launched into the air, but also easily shatter once hit by only a few pellets from a shotgun. The shattered pieces are environmentally friendly because they are made of natural ingredients that are not only edible but are attractive to local wildlife. The shattered pieces are biodegradable and, as indicated, can be consumed by local wildlife.

Those skilled in the art will appreciate that the method provided above is for the purpose of providing an example and only represents one method in which the disc targets 10 can be manufactured. Variations in the method described can include higher or lower temperatures in freezing and freeze drying, a longer or shorter time of freezing or freeze drying, or slight variations in the amount of ingredients used. Other variations will achieve the production of the final disc target with near identical results.

ALTERNATIVE EMBODIMENTS

Those skilled in the art that alternative methods and ingredients can be used in the process above to achieve similar results. One such alternative, involves the addition of eggs to the mixture. This process follows the preferred method for producing the disc target 10, but instead uses 150 grams of powdered alfalfa 12, 120 grams of flour, and 3 eggs in the mixture. The combined ingredients should have a thick dough-like texture when property mixed 40. Another embodiment mixes 300 grams of powdered alfalfa 12, and 180 grams of scrap food paste in the same process that should result in a sticky soup texture when properly mixed 40.

These recipes, after following the steps 40-44 produce a disc target 10 with similar structural and functional properties to the preferred embodiment which can be optionally painted or dipped with a food grade colorant 45. These alternative recipes, like the preferred method, result in a disc target 10 that is non-toxic and edible to wildlife. They also result in a disc target 10 that is sturdy and capable of withstanding the force of being launched in the air, but reliably shatters into biodegradable and edible debris 34 when hit with a shotgun pellet.

Figure 5:
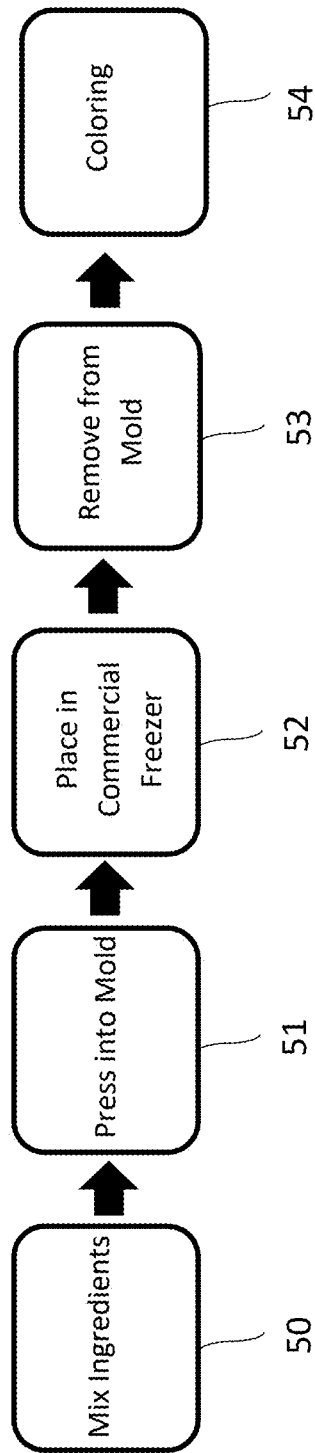
FIG. 5 shows a flow diagram illustrating an alternate method of manufacturing the biodegradable and edible disc target 10.

Other embodiments do not use the freeze dry process, as shown in FIG. 5. The first step 50 of one such embodiment uses 300 grams of powdered alfalfa 12 mixed with 180 grams of boiled pasta. When properly mixed 50, the combined powdered alfalfa 12 and boiled pasta results in a wet and sticky texture. Next, the mixture is pressed into the mold, preferably one that is 108 to 110 mm in diameter and 28 to 29 mm in height, in the next step 51. The mold with the mixture within is placed into a regular commercial freezer in the following step 52. The mold is left for 30 to 45 minutes in the freezer or until the mixture is hard enough to be extracted from the mold. Next, the frozen disc target 10 is removed from the mold in the following step 53. Optionally, the disc target 10 can be painted to dipped with food grade coloring in the final step 54. The resulting disc target 10 using this method results in a solid compound pigeon suitable for shooting sports but is softer and more pliable than preferred embodiment.

Another alternative recipe using these steps 50-55, starts with mixing 150 grams of powdered alfalfa 12 and 80 grams of beeswax. The resulting mixture should be a soupy texture when properly mixed 50. Next, the mixture is pressed into the mold, preferably one that is 108 to 110 mm in diameter and 28 to 29 mm in height, in the next step 51. The mold with the mixture within is placed into a regular commercial freezer in the following step 52. The mold is left for 30 to 45 minutes in the freezer or until the mixture is hard enough to be extracted from the mold. Next, the frozen disc target 10 is removed from the mold in the following step 53. Optionally, the disc target 10 can be painted to dipped with food grade coloring in the final step 54. The resulting texture has a waxy texture.

Those skilled in the art will recognize that due to the numerous suitable binding agents available that will result in a disc target 10 that is biodegradable and edible, the recipes above are examples provided for illustrative purposes and are non-limiting. Other binding agents may be used including, but not limited to, molasses, agar agar, soy powder, gluten, other starches or even wood glue.

The figures and descriptions in this application depict specific examples to teach those skilled in the art how to make and use the best mode of the invention. These examples are not given to limit the scope of the invention, but rather to teach inventive principles. To concisely teach inventive principles, some conventional aspects of the invention have been simplified or omitted. Those skilled in the art will appreciate many of the configurations, combinations, subcombinations, and variations on these examples that fall within the scope of the invention. For example, certain features of the invention described in separate embodiments can also be implemented in combination in a single embodiment. Conversely, various features that are described in the context of a single embodiment can also be implemented in multiple embodiments—separately or in any suitable subcombination. The invention is not limited to the specific illustrative examples described herein, but by all embodiments and methods within the scope and spirit of the invention as in the current, amended, or added claims and their equivalents. In any case, all substantially equivalent systems, articles, and methods should be considered within the scope of the invention.

We claim:

1. A method for manufacturing a target for use in shooting sports, comprising:
    a) producing a mixture comprising of a grain or a legume and one or more binding agents, wherein said grain or legume comprises at least 50% by weight of said mixture, and said binding agents are biodegradable, non-toxic, and edible to wildlife;
    b) compressing said mixture into a disc shaped mold to form the mixture in the shape of a disc, wherein the mold comprises a first piece defining a top of the shape of the disc, a second piece defining a bottom of the shape of the disc, and third piece defining a middle portion of the shape of the disc;
    c) temperature curing said mold with said mixture within until sufficiently dehydrated enough to remove the mixture from said mold entirely, thereby producing a solid disc from the mixture; and
    d) removing said solid disc from said mold, thereby producing a disc shape target, wherein said disc shaped target is geometrically compatible with the dimensions of common launching devices or methods used for shooting sport applications, and is capable of withstanding the primary stresses induced by common launching methods yet sufficiently fractures into fragments upon contact with a shot projectile, and wherein said fragments are biodegradable and both edible and digestible for wildlife.

2. The method of claim 1, wherein said legume is powdered alfalfa.

3. The method of claim 1, wherein said mixture comprises flour, water, molasses, agar agar, soy powder, gluten, eggs, boiled pasta, or beeswax as binding agents.

4. The method of claim 1, wherein said mold has a diameter approximately between 108 and 110 millimeters and a height approximately between 28 and 29 millimeters and said target has a final mass approximately between 100 and 105 grams.

5. The method of claim 1, wherein said mixture consists entirely of natural ingredients.

6. The method of claim 1, wherein said disc shaped target is dyed or painted with a food grade colorant.

7. The method of claim 1, wherein said binding agent is a natural wax.

8. A method for manufacturing a target for use in shooting sports, comprising:
    a) producing a mixture comprising of bird seed or a legume and one or more binding agents, wherein said bird seed or legume comprises at least 50% by weight of said mixture, and said binding agents are biodegradable, non-toxic, and edible to wildlife;
    b) compressing said mixture into a disc shaped mold to form the mixture in the shape of a disc, wherein the mold comprises a first piece defining a top of the shape of the disc, a second piece defining a bottom of the shape of the disc, and third piece defining a middle portion of the shape of the disc;
    c) temperature curing said mold with said mixture within until sufficiently dehydrated enough to remove the mixture from said mold entirely, thereby producing a solid disc from the mixture; and
    d) removing said solid disc from said mold, thereby producing a disc shape target, wherein said disc shaped target is geometrically compatible with the dimensions of common launching devices or methods used for shooting sport applications, and is capable of withstanding the primary stresses induced by common launching methods yet sufficiently fractures into fragments upon contact with a shot projectile, and wherein said fragments are biodegradable and both edible and digestible for wildlife.

9. The method of claim 8, wherein said legume comprises alfalfa.

10. The method of claim 8, wherein said mixture comprises corn starch, molasses, agar agar, soy powder, gluten, or glue as binding agents.

11. The method of claim 8, wherein said mold has a diameter approximately between 108 and 110 millimeters and a height approximately between 28 and 29 millimeters and said target has a final mass approximately between 100 and 105 grams.

12. The method of claim 8, wherein said mixture consists entirely of natural ingredients.

13. The method of claim 8, wherein said disc shaped target is dyed or painted with a food grade colorant.

14. A system for manufacturing a target for use in shooting sports, comprising:
  a) producing a mixture comprising of a primary natural ingredient and one or more binding agents, wherein said primary natural ingredient comprises at least 50% by weight of said mixture and said binding agents are biodegradable, non-toxic, and edible to wildlife, wherein said one or more binding agents comprises flour, molasses, agar agar, soy powder, gluten, eggs, boiled pasta, beeswax, or glue;
  b) compressing said mixture into a two-piece mold to form the mixture into a disc shape, wherein the mold comprises a first piece defining the top of the shape of the disc, wherein said first piece is configured to form protrusions of the disc, and a second piece defining the bottom of the shape of the disc, wherein said second piece comprises a knob for a user to grab when assembling or disassembling said two-piece mold; and
  c) producing a solid disc shape target from compressing said mixture into said two-piece mold, wherein said disc shaped target is geometrically compatible with the dimensions of common launching devices or methods used for shooting sport applications, and is capable of withstanding the primary stresses induced by common launching methods yet sufficiently fractures into fragments upon contact with a shot projecting, and wherein said fragments are biodegradable and both edible and digestible for wildlife.

15. The system of claim 14, wherein said mixture within said two-piece mold is cured until said mixture is sufficiently hardened enough to remove said mixture from said two-piece mold entirely, thereby producing said solid disc from said mixture.

16. The system of claim 14, wherein said primary natural ingredient is a legume.

17. The system of claim 14, wherein said one or more binding agents further comprises corn starch, water, or wood glue.

18. The system of claim 14, wherein said mold has a diameter approximately between 108 and 110 millimeters and a height approximately between 28 and 29 millimeters and said target has a final mass approximately between 100 and 105 grams.

19. The system of claim 14, wherein said primary natural ingredient is bird seed.

20. The system of claim 14, wherein said disc shaped target is dyed or painted with a food grade colorant.

* * * * *